United States Patent
Xu et al.

(10) Patent No.: US 12,306,340 B2
(45) Date of Patent: May 20, 2025

(54) IDENTIFICATION METHOD OF SEABED WEAK ECHOES BY AIRBORNE LiDAR BATHYMETRY AND SYSTEM THEREOF

(71) Applicant: FIRST INSTITUTE OF OCEANOGRAPHY, MNR, Qingdao (CN)

(72) Inventors: Wenxue Xu, Qingdao (CN); Yanxiong Liu, Qingdao (CN); Yadong Guo, Qingdao (CN); Yikai Feng, Qingdao (CN); Deming Ma, Qingdao (CN); Jie Li, Qingdao (CN); Qiuhua Tang, Qingdao (CN)

(73) Assignee: FIRST INSTITUTE OF OCEANOGRAPHY, MNR, Qingdao (CN)

( * ) Notice: Subject to any disclaimer, the term of this patent is extended or adjusted under 35 U.S.C. 154(b) by 0 days.

(21) Appl. No.: 18/778,879

(22) Filed: Jul. 19, 2024

(65) Prior Publication Data
US 2025/0028024 A1    Jan. 23, 2025

(51) Int. Cl.
*G01S 7/48* (2006.01)
*G01S 7/487* (2006.01)
*G01S 17/89* (2020.01)

(52) U.S. Cl.
CPC .......... *G01S 7/4802* (2013.01); *G01S 7/4808* (2013.01); *G01S 7/487* (2013.01); *G01S 17/89* (2013.01)

(58) Field of Classification Search
CPC ...... G01S 7/4802; G01S 7/4808; G01S 7/487; G01S 17/89
See application file for complete search history.

(56) References Cited

U.S. PATENT DOCUMENTS

2024/0185423 A1*    6/2024    Nepveaux .............. G06V 20/64

FOREIGN PATENT DOCUMENTS

| CN | 110133670 A | 8/2019 |
| CN | 110134976 B | 8/2019 |

(Continued)

OTHER PUBLICATIONS

Kogut et al., "Classification of airborne laser bathymetry data using artificial neural networks," IEEE Journal of Selected Topics in Applied Earth Observations and Remote Sensing, 14, 1959-1966, (2021). (Year: 2021).*

(Continued)

*Primary Examiner* — Yuqing Xiao
*Assistant Examiner* — Zhengqing Qi
(74) *Attorney, Agent, or Firm* — Inskeep IP Group, Inc.

(57) ABSTRACT

An identification method of seabed weak echoes in airborne LiDAR bathymetry and a system thereof are provided, which belong to the technical field of marine surveying and mapping. The method includes: dividing sea area laser pulses into surface-seabed pulses or seabed-undefined pulses based on preprocessed data; using two-stage local maximum method to determine potential seabed echo positions of ALB waveforms and pre-generate seabed points; defining an ellipsoid neighborhood related to density and extracting spatial features of a pre-generated point cloud; constructing a BP neural network to identify seabed points in the pre-generated point cloud, and optimizing the identification result of the seabed points based on a laser pulse echo sequence and point cloud density.

9 Claims, 8 Drawing Sheets

(56) References Cited

FOREIGN PATENT DOCUMENTS

| | | | |
|---|---|---|---|
| CN | 110135299 | A | 8/2019 |
| CN | 113837326 | A | 12/2021 |
| CN | 115422981 | B | 12/2022 |
| CN | 116609759 | B | 10/2023 |

OTHER PUBLICATIONS

Li et al., "Pointwise classification of mobile laser scanning point clouds of urban scenes using raw data," Journal of Applied Remote Sensing, 15(2), 024523-024523 (2021). (Year: 2021).*

Lowell et al., "Operational performance of a combined Density-and Clustering-based approach to extract bathymetry returns from LiDAR point clouds," International Journal of Applied Earth Observation and Geoinformation 107:102699 (2022). (Year: 2022).*

China National Intellectual Property Administration, First Office Action issued Aug. 25, 2023 in Chinese Patent Application No. 202310897957.X filed Jul. 21, 2023 (with English translation), 7 pages.

China National Intellectual Property Administration, Second Office Action issued Sep. 20, 2023 in Chinese Patent Application No. 202310897957.X filed Jul. 21, 2023 (with English translation), 7 pages.

China National Intellectual Property Administration, Notification of Grant issued Oct. 12, 2023 in Chinese Patent Application No. 202310897957.X filed Jul. 21, 2023 (with English translation), 3 pages.

Yang, F. et al., "An airborne LiDAR bathymetric waveform decomposition method in very shallow water: A case study around Yuanzhi Island in the South China Sea," *International Journal of Applied Earth Observations and Geoinformation*, Elsevier B.V. 2022, 11 pages.

Mader, D. et al., "Detention and Extraction of Water Bottom Topography From Laserbathymetry Data By Using Full-Waveform-Stacking Techniques," *The International Archives of the Photogrammetry, Remote Sensing and Spatial Information Sciences*, vol. XLII-2/W13, 2019, pp. 8 pages.

Kogut, T. et al., "Improvement of Full Waveform Airborne Laser Bathymetry Data Processing bases on Waves of Neighborhood Points," *remote sensing*, 2019, 13 pages.

* cited by examiner

IDENTIFICATION METHOD OF SEABED WEAK ECHOES BY AIRBORNE LiDAR BATHYMETRY AND SYSTEM THEREOF

CROSS-REFERENCE TO RELATED APPLICATION

This patent application claims the benefit and priority of Chinese Patent Application No. 202310897957.X filed with the China National Intellectual Property Administration on Jul. 21, 2023, the present disclosure of which is incorporated by reference herein in its entirety as part of the present application.

TECHNICAL FIELD

The present disclosure belongs to the technical field of marine surveying and mapping, and in particular relates to an identification method of seabed weak echoes by airborne LiDAR bathymetry and a system thereof.

BACKGROUND

Underwater three-dimensional topography is a basic surveying and mapping element to describe the fluctuation of the seabed and the change in the water depth, which plays a vital role in marine engineering development, ship navigation, fishery and ecological protection. As climate change results in rising of the sea level and expansion of human activities, underwater topography changes more frequently, so that high-efficient and high-precision underwater three-dimensional topographic measurement and monitoring in shallow water become particularly critical. Full-waveform Airborne LiDAR Bathymetry (ALB) is an active optical water depth measurement method. The laser emits high-purity and narrow-beam laser pulses while moving with the platform, and the receiver receives the backscattered echo waveforms of targets. With the help of positioning and attitude sensor data, strip-type rapid measurement can be realized, which has the advantages of high bathymetry precision and high efficiency. Therefore, ALB is very suitable for shallow water depth measurement in areas with clear water quality and is broad in application and development prospects.

The laser pulses emitted by the ALB occur multiple optical effects with the air-sea interface, water body and seabed, and signal intensities decay rapidly under water. Due to influence from factors such as sea waves and substances in water body, the intensities of background noise echoes are stronger than those in land, leading to a low signal-to-noise ratio of seabed echoes and making it difficult to identify seabed weak echoes. In airborne LiDAR systems, constant fraction discriminator (CFD) is often used to identify target echoes, which is highly reliable but omits some seabed weak echoes. Waveform processing methods such as peak detection, mathematical fitting and deconvolution have good applicability to the ALB waveform with obvious double peaks, and more effective information can be extracted. However, the echo peak of the seabed weak echo is similar to the noise peak. How to identify the real seabed position from the complex waveform with low signal-to-noise ratio needs further study. At present, some progress has been made in the identification of weak echoes of seabed points in shallow water areas. Mader et al. (2019) proposed a neighborhood waveform stacking technology; Kogut et al. (2019) used the double-echo seabed position to determine the range of the adjacent single-echo seabed position, and determined the seabed point position in combination with a Gaussian function; Yang et al. (2022) proposed a decomposition method based on signal resolution enhancement and fractional differentiation, which improved the identification rate of seabed points in an extremely shallow water area (<2 m). Compared with shallow water areas, the beam propagation time in deeper water areas (the deeper water areas of the present disclosure is relative to the ALB bathymetry ability) is longer, and it is more obviously influenced by the refraction effect and the scattering effect. Therefore, there are great differences in the waveforms of the seabed echo positions of adjacent waveforms. Patent solutions for ALB data processing mainly focus on waveform denoising (Chinese patent application publication No. CN110133670A, published on Aug. 16, 2019), signal extraction (Chinese patent application publication No. CN110134976B, published on Aug. 16, 2019), waveform analysis (Chinese patent application publication No. CN110135299A, published on Aug. 16, 2019), data registration (Chinese patent application publication No. CN113837326A, published on Dec. 24, 2021), land and water waveform classification (Chinese patent application publication No. CN115422981B, published on Dec. 2, 2022), etc. To sum up, there is still a lack of an effective identification method of a low signal-to-noise ratio of seabed weak echoes in deeper water areas.

Through the above analysis, ALB technology has the following problems and defects: The laser pulses emitted by the ALB occur multiple optical effects with the air-sea interface, water body and seabed, and signal intensities decay rapidly under water. Due to influence from factors such as sea waves and substances in water body, the intensities of background noise are stronger than those in land, leading to a low signal-to-noise ratio of seabed echo and making it difficult to identify seabed weak echoes.

The propagation time of the laser pulse in deeper water areas (relative to the ALB) is longer, and it is more obviously influenced by a refraction effect and a scattering effect. Therefore, the seabed echo positions of adjacent waveforms are quite different in waveforms. In addition, the differences in the seawater depth and the geology type further increase the difficulty of identifying seabed weak echoes.

SUMMARY

In order to overcome the problems existing in the related field, the embodiment provided by the present disclosure provides an identification method of seabed weak echoes in airborne LiDAR bathymetry and a system thereof.

The technical solution is as follows: an identification method of seabed weak echoes in airborne LiDAR bathymetry, where the method includes the following steps:
 S1: dividing sea area laser pulses into surface-seabed pulses or seabed-undefined pulses based on preprocessed data;
 S2: using two-stage local maximum method to determine potential seabed echo positions of ALB waveforms and pre-generate seabed points;
 S3: extracting spatial features of a pre-generated point cloud by using an ellipsoid neighborhood; and
 S4: constructing a BP neural network to identify seabed points in the pre-generated point cloud, and optimizing the identification result of the seabed points based on a laser pulse echo sequence and point cloud density.

In Step S2, using two-stage local maximum method to determine the potential seabed echo position of each echo waveform and pre-generate the seabed points specifically includes the following steps:

Step S2.1: determining the sea surface echo peak through a relationship between echo intensity and noise;

Step S2.2: determining the potential seabed echo positions, which comprises: with a maximum bathymetry performance of the Airborne LiDAR Bathymetry (ALB) system being $D_{max}$, intercepting the waveform length corresponding to $2D_{max}$ after the sea surface echo peak as the effective waveforms; calculating all local maximum points in the effective waveform after the sea surface echo to obtain a first-stage local maximum sequence LMPF; and then calculating local maximums of the LMPF to obtain a second-stage local maximum sequence LMPS as the potential seabed echo positions; and Step S2.3: pre-generating the seabed points, which comprises: constructing a coordinate solving model of the seabed points on a basis of a distance, an angle and a coplanar condition equation according to a time difference between the extracted second-stage local maximum sequence LMPS and corresponding sea surface echo position, and solving an optimal solution of an equation set by a Levenberg-Marquardt method; solving positions of all point clouds for the second-stage local maximum sequence LMPS of all waveforms to obtain a potential seabed point cloud; and labeling seabed points after a coordinate solution for the surface-seabed pulses.

In Step S2.1, determining the sea surface echo peak through the relationship between echo intensity and noise includes:

calculating a mean value $N_b$ and a standard deviation $N_\sigma$ of last 50 sampling points of the echo waveform, and calculating maximums LMP of the echo waveform by using formula (1), and selecting a first local maximum point with intensity greater than $N_b+3N_\sigma$ in the LMP as the sea surface echo peak;

$$LMP = WF \text{ (find } (\text{diff } (\text{sign}(\text{diff}(WF))) < 0) + 1) \quad (1)$$

where WF represents the effective waveform, find represents finding the waveform positions that satisfy a condition, diff represents a difference function, and sign represents a sign function;

in Step S2.2, the first-stage local maximum sequence LMPF is expressed as:

$$LMPF = WFAS(\text{find } (\text{diff}(\text{sign}(\text{diff}(WFAS))) < 0) + 1) \quad (2)$$

where WFAS is the effective waveform after the sea surface echo;

the second-stage local maximum sequence LMPS is expressed as:

$$LMPS = LMPF(\text{find } (\text{diff}(\text{sign}(\text{diff}(LMPF))) < 0) + 1) \quad (3)$$

in Step S2.3, the coordinate solving model of the seabed points includes:

$$f_1(x, y, z) = (x - x_s)^2 + (y - y_s)^2 + (z - z_s)^2 - \frac{c\Delta f}{2n_w} \quad (4)$$

$$f_2(x, y, z) = (n_1, n_2, n_3) \cdot (x, y, z) + \frac{c\Delta t \cos(\theta_r)}{2n_w} - (x_s, y_s, z_s) \cdot (n_1, n_2, n_3) \quad (5)$$

$$f_3(x, y, z) = v_1 n_2(z - z_s) + v_2 n_3(x - x_s) + \quad (6)$$
$$v_3 n_1(y - y_s) - v_3 n_2(x - x_s) - v_2 n_1(z - z_s) - v_1 n_3(y - y_s)$$

where $f_1(x, y, z)$, $f_2(x, y, z)$, $f_3(x, y, z)$ are three equations of coordinate solution of seabed points, (x, y, z) is coordinates of a potential seabed points, $(x_s, y_s, z_s)$ is coordinates of the corresponding sea surface point, c is a speed of light in the air, $\Delta t$ is a time difference between the sea surface and a second-stage local maximum, $n_w$ is the seawater refractive index, $(n_1, n_2, n_3)$ represents a normal vector of the sea surface which is obtained by fitting a Gaussian quadric surface to sea surface points near $(x_s, y_s, z_s)$, $(v_1, v_2, v_3)=(x_s-x_p, y_s-y_p, z_s-z_p)$ is a laser pulse emission vector, $(x_p, y_p, z_p)$ is a laser position at a pulse emission moment, and $\theta_r$ is a refraction angle which is calculated by formula (7):

$$\theta_r = \arcsin\left(\frac{\sin\left(\arccos\frac{(v_1, v_2, v_3) \cdot (n_1, n_2, n_3)}{|(v_1, v_2, v_3)||(n_1, n_2, n_3)|}\right)}{n_w}\right). \quad (7)$$

In Step S3, extracting spatial features of pre-generated point cloud by using an ellipsoid neighborhood includes the following steps:

S3.1: determining ellipsoid neighborhood parameters;
S3.2: finding ellipsoid neighborhood points; and
S3.3: extracting the spatial features of the point cloud.

In Step S3.1, determining the ellipsoid neighborhood parameters includes: constructing the seabed points as grids, in which if there are points in a grid, the grid area is scanned, and average point density $\rho$ is calculated by the following formula:

$$\rho = \frac{N_p}{N_g w^2} \quad (8)$$

where $N_p$ is a number of the seabed points generated by an ALB system, $N_g$ is a number of grids with seabed points, and w is a width of the grid;

wherein, three semi-axes of the ellipsoid are set as $$l_x = l_y = \frac{4}{\sqrt{\rho}}$$

and $$l_z = \frac{2}{\sqrt{\rho}};$$

in Step S3.2, finding the ellipsoid neighborhood points includes: taking the pre-generated potential seabed point cloud as a point set, constructing a KD tree to shorten neighborhood search time; for a certain point p($p_x$, $p_y$, $p_z$) in the point cloud, finding a neighborhood points whose Euclidean distances from the point p are less than a semi-major axis $l_x$ of the ellipsoid, and points in these neighborhood points that satisfy the following formula are neighborhood points within the ellipsoid;

$$EPS = \left\{ (x_n, y_n, z_n) \left| \frac{(z_n - p_z)^2}{l_z^2} < \left(1 - \frac{(x_n - p_x)^2}{l_x^2} - \frac{(y_n - p_y)^2}{l_y^2}\right) \right. \right\} \quad (9)$$

where EPS is an ellipsoid neighborhood point set of the point p($p_x$, $p_y$, $p_z$), ($x_n$, $y_n$, $z_n$) is coordinates of a neighborhood point in the ellipsoid of the point p, and $l_x$, $l_y$, $l_z$ are lengths of the three semi-axes of the ellipsoid.

In Step S3.3, extracting the spatial features of point the clouds include: calculating a covariance matrix and three eigenvalues of the ellipsoid neighborhood points, and obtaining $\lambda_1$, $\lambda_2$, $\lambda_3$ in a descending order, and obtaining standardized eigenvalues $e_1$, $e_2$, $e_3$ according to $$e_i = \frac{\lambda_i}{\sum \lambda_i};$$

taking the eigenvalues $e_1$, $e_2$, $e_3$, a number n of points in the ellipsoid neighborhood, linearity Le, planarity Pe, scattering Se, anisotropy Ae, an omni-directional variance Oe and an eigenvalue entropy Ee as the spatial features of the point cloud, which are calculated as follows:

$$Le = \frac{e_1 - e_2}{e_1} \quad (10)$$

$$Pe = \frac{e_2 - e_3}{e_1} \quad (11)$$

$$Se = \frac{e_3}{e_1} \quad (12)$$

$$Ae = \frac{e_1 - e_3}{e_1} \quad (13)$$

$$Oe = \sqrt[3]{e_1 e_2 e_3} \quad (14)$$

$$Ee = \sum_{i=1}^{3} e_i \ln(e_i) \quad (15)$$

where $\ln(e_i)$ is a natural logarithm of the eigenvalues $e_1$, $e_2$, $e_3$; finally constructed spatial features of the point cloud are {$e_1$, $e_2$, $e_3$, n, Le, Pe, Se, Ae, Oe, Ee}.

In Step S4, constructing the BP neural network to identify the seabed points in the pre-generated point cloud, and optimizing the identification result of the seabed points based on the laser pulse echo sequence and the point cloud density includes the following steps:

Step S4.1, constructing the BP neural network and identifying the seabed points; and Step S4.2, optimizing the identification result of the seabed points.

In Step S4.1, constructing the BP neural network and identifying the seabed points includes:

taking seabed point cloud generated by the surface-seabed pulses as training, verification and test data of the BP neural network with a ratio of 7:1.5:1.5, labelling a category of seabed points as 1, labelling category of rest points as 0; constructing a three-layer BP neural network including an input layer, a hidden layer and an output layer, in which 10-dimensional spatial features extracted by using the ellipsoid neighborhood are input, a number of nodes of the hidden layer is set to 100, and the seabed points or the rest points are output; before network training, training samples, verification samples and test samples are normalized to an interval of [0,1] in a same way; and taking a point cloud generated by the seabed-undefined pulses as data to be identified to be normalized to the interval of [0,1] in the same way; using the constructed BP neural network to identify the point cloud generated by the seabed-undefined pulses, in which the point labelled as 1 in the final identification result are a rough seabed point cloud for identification.

In Step S4.2, optimizing the identification result of the seabed points includes:

reserving a first seabed point of each laser pulse in the result of the BP neural network, extracting a high-density target point cluster from a noise point cloud by using a density-based clustering algorithm, taking a refraction and a factor without seabed echoes into account, setting a search radius of the density clustering algorithm as $$eps = \frac{3}{\sqrt{\rho}},$$

and a minimum number of points MinN as 20, and deleting a point cluster which has less than 100 points or is disconnected from the point cloud; and taking finally reserved points as seabed point cloud for identification.

Another object of the present disclosure is to provide a system of identification seabed weak echoes in airborne LiDAR bathymetry, the identification method of seabed weak echoes in airborne LiDAR bathymetry is implemented, and the system includes:

a sea area laser pulse dividing module, which is configured to divide sea area laser pulses into surface-seabed pulses or seabed-undefined pulses based on preprocessed data;

a seabed point pre-generating module, which is configured to use two-stage local maximum method to determine potential seabed echo positions of ALB waveforms and pre-generate seabed points;

a spatial feature extracting module of a pre-generated point cloud, which is configured to define an ellipsoid neighborhood related to a density and extract spatial features of pre-generated point cloud; and a seabed point identifying module, which is configured to construct a BP neural network to identify seabed points in the pre-generated point cloud, and optimize the identification result of the seabed points based on a laser pulse echo sequence and point cloud density.

In combination with all the technical solutions mentioned above, the present disclosure has the following advantages and positive effects: aiming at the problem that the echo waveform of the full waveform ALB is influenced by multiple targets such as the air-sea interface, the water body and the seabed, which leads to a low signal-to-noise ratio of some laser pulse echoes and is difficult to identify the weak echoes, and that the existing technical solutions cannot solve the problem of signal extraction when the echo peak of the seabed weak echo is similar to the noise peak, the present disclosure provides an identification method of seabed weak echoes based on pre-generated and identified airborne LiDAR bathymetry. Without the assistance of other information, the bathymetry ability of the ALB technology in water areas is improved, and the coverage area and density of point cloud are increased, so as to make full use of single measurement data.

Compared with the conventional field, the present disclosure further includes the following advantages: the present disclosure innovatively puts forward a determination method of the potential seabed echo positions by means of the two-stage local maximum methods which take into account the calculation efficiency and the seabed point retention. According to the method, the spatial features of ellipsoid neighborhood points are calculated based on the characteristics of seabed point cloud, and the distribution differences between seabed points and noise points are better expressed. According to the method, the seabed points with high reliability generated by the system are used as samples to automatically construct a neural network, and information, such as a geometric neighborhood, is combined to effectively improve the available maximum bathymetry capacity of airborne LiDAR bathymetry and the number of point cloud. Without the assistance of other data, the proposed solution is applied to two strips of the sandy and gravel geological areas of an island. Compared with the number of points generated by the system, the number of points generated by identification is increased by 195.9%, and the maximum available bathymetry depth is increased by 60%. The identification result is obviously better than a three-parameter product method (PPIA) and Richardson-Lucy deconvolution method (RLD). Compared with the point cloud generated by the system and the multi-beam echo sounder point cloud, the points added by the proposed solution are high in reliability. Therefore, the proposed method has good results in the seabed geology types such as sand and gravel, which is an effective and reliable identification method of ALB seabed weak echoes.

The positive effect of the present disclosure is also reflected in the following important aspects: (1) Airborne LiDAR bathymetry has obvious advantages in shallow water depth measurement in coastal zones, islands and reefs, and the present disclosure further improves the bathymetric ability and the data quality of the ALB from data post-processing. In the future, ALB system manufacturers and researchers can use a CFD method and the method of the present disclosure to obtain seabed point cloud with the larger point density, the wider measurement range and the deeper measurement area, so that the ALB data can be fully utilized, and the expected benefits and the commercial value are considerable. (2) At present, the waveform data processing technologies of airborne LiDAR bathymetry are only suitable for waveforms with obvious double peaks, and the method of identifying seabed weak echoes focuses on shallow water areas and the research is not mature. The technical solution proposed by the present disclosure is applicable to both shallow water and deeper water areas (relative to the ALB bathymetry ability), which fills the technical gap of identification of seabed weak echoes. (3) The identification of the seabed weak echo waveform and the weak echo waveform similar to the noise peak has always been a technical problem in ALB data processing. The present disclosure integrates the echo waveform features and the spatial features of pre-generated point cloud, and the seabed points are highly identified and high in reliability. (4) The present disclosure improves the available maximum bathymetry and the seabed point density of the ALB to a certain extent, which is beneficial to the popularization and application of the ALB technology.

BRIEF DESCRIPTION OF THE DRAWINGS

The accompanying drawings, which are incorporated in and constitute a part of this specification, illustrate embodiments consistent with the present disclosure, and together with the description, serve to explain the principles of the present disclosure.

In the figures: 1. Sea area laser pulse dividing module; 2. Seabed point pre-generating module; 3. Spatial feature extracting module of a pre-generated point cloud; 4. Seabed point identifying module.

DETAILED DESCRIPTION OF THE EMBODIMENTS

In order to make the above objects, features and advantages of the present disclosure more obvious and understandable, the detailed description of the present disclosure will be described in detail with reference to the accompanying drawings. In the following description, numerous specific details are set forth in order to provide a thorough understanding of the present disclosure. However, the present disclosure can be implemented in many other ways different from those described here. Those skilled in the field can make similar improvements without violating the connotation of the present disclosure. Therefore, the present disclosure is not limited by the specific embodiments provided hereinafter.

The embodiment of the present disclosure provides a method of realizing identification of seabed weak echoes by a pre-generating and identifying method. This method is reasonable in design, which solves the problem that the confusion between an echo with weak intensity and noise makes it difficult to identify seabed weak echo waveform. The proposed method has good results in a plurality of seabed geology types such as sandy, reef and coral reef, which is an effective and reliable identification method of ALB seabed weak echoes.

Figure 1:
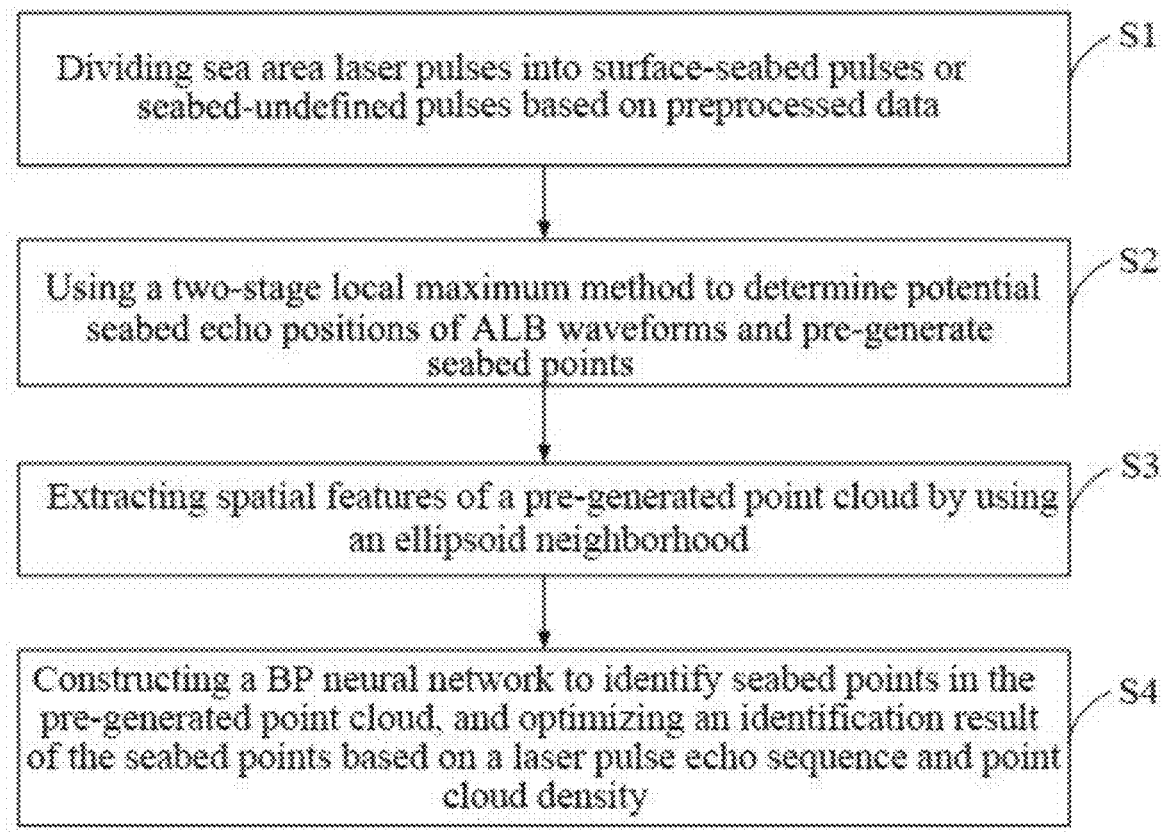
FIG. 1 is a flow chart of an identification method of seabed weak echoes by airborne LiDAR bathymetry according to an embodiment of the present disclosure.

In Embodiment 1, as shown in FIG. 1, an identification method of seabed weak echoes by airborne LiDAR bathymetry according to an embodiment of the present disclosure includes the following steps:

S1, dividing sea area laser pulses into surface-seabed pulses or seabed-undefined pulses based on preprocessed data;

S2, using two-stage local maximum method to determine potential seabed echo positions of ALB waveforms and pre-generate seabed points;

S3, extracting spatial features of a pre-generated point cloud by using an ellipsoid neighborhood;

S4, constructing a BP neural network to identify seabed points in the pre-generated point cloud, and optimizing the identification result of the seabed points based on a laser pulse echo sequence and point cloud density.

In Step S1 of the embodiment of the present disclosure, dividing the sea area laser pulses into the surface-seabed pulses or seabed-undefined pulses based on the preprocessed data has the following steps:

According to the GNSS measurement time, laser point cloud and waveforms generated by the ALB system are matched. The water area point cloud and the waveform data are obtained by land and water classification, and a sea surface elevation interval is also obtained. The number of points matched by each laser pulse is counted. When one laser pulse corresponds to two points, the pulse is a surface-seabed pulse. When a laser pulse corresponds to a point and the elevation of the point is within the range of the sea surface elevation interval, the pulse is defined as a seabed-undefined pulse.

In Step S2 of the embodiment of the present disclosure, using the two-stage local maximum method to determine the potential seabed echo positions of the echo waveform and pre-generate the seabed points specifically includes the following steps:

Step S2.1, the sea surface echo peak is determined.

In the water waveform, the sea surface echo peak is a first obvious peak in the echo waveform, which can be determined by a relationship between intensity and noise. A mean value $N_b$ and a standard deviation $N_\sigma$ of last 50 sampling points of the echo waveform are calculated, and maximums LMP of the echo waveform are calculated by using formula (1), and a first local maximum point with intensity greater than $N_b + 3N_\sigma$ in the LMP is selected as the sea surface echo peak;

$$LMP = WF(\text{find}(\text{diff}(\text{sign}(\text{diff}(WF))) < 0) + 1) \quad (1)$$

where WF represents an effective waveform, find represents finding waveform positions that satisfy a condition, diff represents a difference function, and sign represents a sign function.

Step S2.2, the potential seabed echo positions are determined.

A maximum bathymetry performance of the ALB system is $D_{max}$, and the waveform length corresponding to $2D_{max}$ after the sea surface echo peak is intercepted as the effective waveforms. A seabed echo can only appear after a sea surface echo. All local maximum points in the effective waveform after the sea surface echo are calculated to obtain a first-stage local maximum sequence LMPF, as in formula (2); and then local maximums of the LMPF are calculated, that is, the potential seabed echo positions, to obtain a second-stage local maximum sequence LMPS as in formula (3).

$$LMPF = WFAS(\text{find}(\text{diff}(\text{sign}(\text{diff}(WFAS))) < 0) + 1) \quad (2)$$

$$LMPS = LMPF(\text{find}(\text{diff}(\text{sign}(\text{diff}(LMPF))) < 0) + 1) \quad (3)$$

where WFAS is the effective waveform after the sea surface echo.

Step S2.3, the seabed points are pre-generated.

The propagation features of a laser pulse in air and seawater are obviously different, and the laser pulse follows Snell's refraction law when passing through an air-sea interface. The present disclosure constructs a coordinate solving model of the seabed points of formula (4) to formula (6) on a basis of a distance, an angle and a coplanar condition equation according to a time difference between the extracted second-stage local maximums and corresponding sea surface echo position, and solves an optimal solution of an equation set by a Levenberg-Marquardt (LM) method.

$$f_1(x, y, z) = (x - x_s)^2 + (y - y_s)^2 + (z - z_s)^2 - \frac{c\Delta t}{2n_w} \quad (4)$$

$$f_2(x, y, z) = (n_1, n_2, n_3) \cdot (x, y, z) + \frac{c\Delta t \cos(\theta_r)}{2n_w} - (x_s, y_s, z_s) \cdot (n_1, n_2, n_3) \quad (5)$$

$$f_3(x, y, z) = v_1 n_2 (z - z_s) + v_2 n_3 (x - x_s) + \quad (6)$$
$$v_3 n_1 (y - y_s) - v_3 n_2 (x - x_s) - v_2 n_1 (z - z_s) - v_1 n_3 (y - y_s)$$

where $f_1(x, y, z)$, $f_2(x, y, z)$, $f_3(x, y, z)$ are three equations of coordinate solution of seabed points, $(x, y, z)$ is coordinates of a potential seabed point, $(x_s, y_s, z_s)$ is coordinates of the corresponding sea surface point, c is a speed of light in the air, $\Delta t$ is a time difference between a sea surface and a second-stage local maximum, $n_w$ is the seawater refractive index, $(n_1, n_2, n_3)$ represents a normal vector of the sea surface which is obtained by fitting a Gaussian quadric surface to sea surface points near $(x_s, y_s, z_s)$, $(v_1, v_2, v_3) = (x_s - x_p, y_s - y_p, z_s - z_p)$ is a laser pulse emission vector, $(x_p, y_p, z_p)$ is a laser position at a pulse emission moment, and $\theta_r$ is a refraction angle which is calculated by formula (7)

$$\theta_r = \arcsin\left(\frac{\sin\left(\arccos\frac{(v_1, v_2, v_3) \cdot (n_1, n_2, n_3)}{|(v_1, v_2, v_3)||(n_1, n_2, n_3)|}\right)}{n_w}\right) \quad (7)$$

The positions of all second-stage local maximums of the waveform in the point cloud are solved to obtain the potential seabed point cloud. The seabed points after the coordinate solution should be labelled for the surface-seabed pulses.

In Step S3 of the embodiment of the present disclosure, defining an ellipsoid neighborhood related to density and extracting spatial features of a pre-generated point cloud have the following steps:

Step S3.1: ellipsoid neighborhood parameters are determined.

Considering that a size of the ellipsoid determines the number of neighboring points, its axis lengths should be related to the point density. The seabed points are constructed as grids, and if there are points in a grid, it is thought that the grid area is scanned, and average point density ρ is calculated by the following formula (8):

$$\rho = \frac{N_p}{N_g w^2} \qquad (8)$$

where $N_p$ is the number of the seabed points generated by the ALB system, $N_g$ is the number of grids with seabed points, and w is a width of the grid. In order to ensure that there are points in the neighborhood of the ellipsoid that satisfy the number of eigenvalues and the seabed points have no general difference in the horizontal direction, three semi-axes of the ellipsoid are set as $$l_x = l_y = \frac{4}{\sqrt{\rho}}$$

and $$l_z = \frac{2}{\sqrt{\rho}}.$$

Step S3.2: ellipsoid neighborhood points are found.

The pre-generated potential seabed point cloud are taken as a point set, a KD tree is constructed to shorten neighborhood search time; for a certain point $p(p_x, p_y, p_z)$ in the point cloud, neighborhood points whose Euclidean distances from the point p are less than a semi-major axis $l_x$ of the ellipsoid are found, and points in these neighborhood points that satisfy the formula (9) are the neighborhood points within the ellipsoid;

$$EPS = \left\{ (x_n, y_n, z_n) \Big| \frac{(z_n - p_z)^2}{l_z^2} < \left(1 - \frac{(x_n - p_x)^2}{l_x^2} - \frac{(y_n - p_y)^2}{l_y^2}\right) \right\} \qquad (9)$$

where EPS is an ellipsoid neighborhood point set of the point $p(p_x, p_y, p_z)$, $(x_n, y_n, z_n)$ is coordinates of a neighborhood point in the ellipsoid of the point p, and $l_x$, $l_y$, $l_z$ are the lengths of the three semi-axes of the ellipsoid.

Step S3.3: spatial features of the point cloud are extracted.

A covariance matrix and three eigenvalues of the ellipsoid neighborhood points are calculated, and $\lambda_1$, $\lambda_2$, $\lambda_3$ are obtained in a descending order, and standardized eigenvalues $e_1$, $e_2$, $e_3$ are obtained according to $$e_i = \frac{\lambda_i}{\sum \lambda_i};$$

the eigenvalues $e_1$, $e_2$, $e_3$, the number n of points in the ellipsoid neighborhood, linearity Le, planarity Pe, scattering Se, anisotropy Ae, an omni-directional variance Oe and an eigenvalue entropy Ee are taken as the spatial features of the point cloud, which are calculated as in formula (10) to formula (15):

$$Le = \frac{e_1 - e_2}{e_1} \qquad (10)$$

$$Pe = \frac{e_2 - e_3}{e_1} \qquad (11)$$

$$Se = \frac{e_3}{e_1} \qquad (12)$$

$$Ae = \frac{e_1 - e_3}{e_1} \qquad (13)$$

$$Oe = \sqrt[3]{e_1 e_2 e_3} \qquad (14)$$

$$Ee = \sum_{i=1}^{3} e_i \ln(e_i) \qquad (15)$$

where $\ln(e_i)$ is a natural logarithm of the eigenvalues $e_1$, $e_2$, $e_3$; the finally constructed spatial features of the point cloud are $\{e_1, e_2, e_3, n, Le, Pe, Se, Ae, Oe, Ee\}$.

In Step S4 of the embodiment of the present disclosure, a BP neural network is constructed to identify seabed points in the pre-generated point cloud, and the identification result of the seabed points are optimized based on a laser pulse echo sequence and point cloud density, which includes the following steps:

Step S4.1: the BP neural network is constructed, and the seabed points are identified.

Seabed point cloud generated by the surface-seabed pulses are taken as the training, verification and test data of the BP neural network with the ratio of 7:1.5:1.5. A category of the seabed points is labelled as 1, and the category of rest points is labelled as 0. A three-layer BP neural network including an input layer, a hidden layer and an output layer is constructed. A 10-dimensional spatial feature extracted by using the ellipsoid neighborhood is input. The number of the nodes of the hidden layer is set to 100. The seabed points or the rest points are output. Before network training, training samples, verification samples and test samples are normalized to an interval of [0,1] in the same way.

The point cloud generated by the seabed-undefined pulses are taken as the data to be identified which is normalized to the interval of [0,1] in the same way. The constructed BP neural network is used to identify the point cloud generated by the seabed-undefined pulses. The points labelled as 1 in the final identification result are rough seabed point cloud for identification.

Step S4.2: the identification result of the seabed points is optimized.

In principle, a single water laser pulse only corresponds to one seabed point. Therefore, the present disclosure only reserves a first seabed point of each laser pulse in the result of the BP neural network. A high-density target point cluster can be extracted from the noise point cloud by using a density-based clustering algorithm (Density-based spatial clustering of applications with noise, DBSCAN). Taking the refraction and a factor without seabed echoes into account, a search radius of the DBSCAN is $$eps = \frac{3}{\sqrt{\rho}},$$

and the minimum number of points MinN is set as 20. In addition, in order to avoid an influence of local small point clusters on the identification result, deleting a point cluster which has less than 100 points or is disconnected from the point cloud; and finally reserved points are the seabed point cloud for identification.

Figure 2:
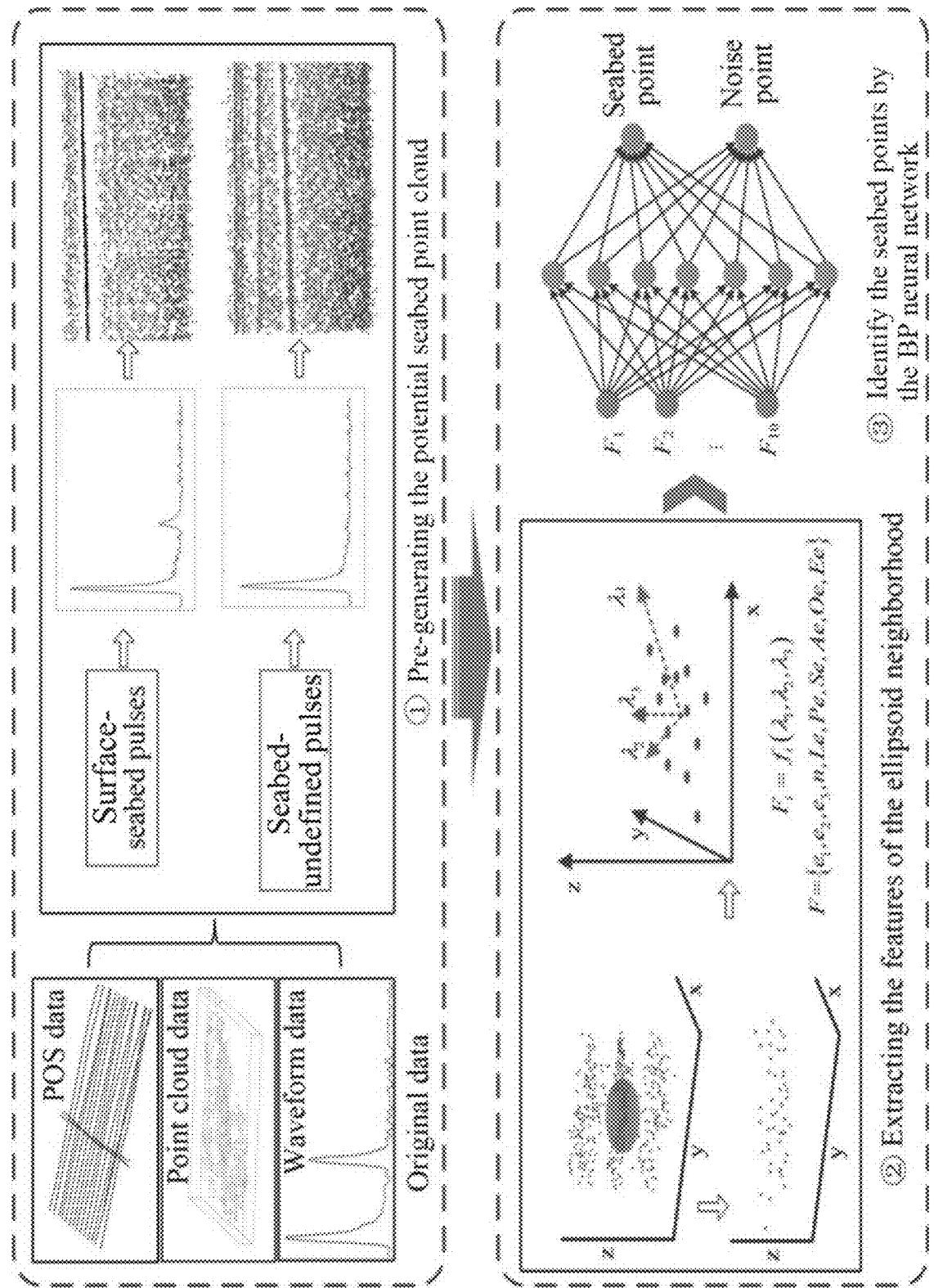
FIG. 2 is a schematic diagram of an identification method of seabed weak echoes by airborne LiDAR bathymetry according to an embodiment of the present disclosure.

Embodiment 2 of the present disclosure, as another embodiment of the present disclosure, takes an island as an application object provides an identification method of seabed weak echoes by airborne LiDAR bathymetry and includes the following steps:

As shown in FIG. 2, the identification method of seabed weak echoes by airborne LiDAR bathymetry according to an embodiment of the present disclosure includes the following steps:

Step 1: sea area laser pulses are divided into surface-seabed pulses or seabed-undefined pulses based on preprocessed data. Identification of seabed weak echoes is an ALB-oriented water area waveform processing method. Taking ALB data obtained by Aquarius system in an island as an embodiment, the Aquarius system is applied in two strips of the sandy and gravel geological areas of the island. First, land and water classification is realized according to statistical features of the waveform and neighborhood features of the point cloud. For water area waveforms, the sea area laser pulses can be divided into a surface-seabed pulses in which a sea surface point and a seabed point are generated by a single emission pulse, or only a sea surface pulse in which only a sea surface point is generated by a single emission pulse according to the number of points generated by the ALB system.

Step 2: two-stage local maximum method are used to determine potential seabed echo positions of ALB waveforms and pre-generate seabed points.

There are many maximum points in the echo waveform of the ALB, and the parameters such as pulse width and intensity cannot effectively distinguish the weak seabed echo from the noise. In order to take into account the calculation efficiency and the retention, the present disclosure puts forward a determination method of the potential seabed echo positions by means of the two-stage local maximum method.

In a further embodiment, step 2 specifically includes the following steps:

Step S2.1, the sea surface echo peak is determined.

In the water waveform, the sea surface echo peak is a first obvious peak in the echo waveform, which can be determined by a relationship between intensity and noise. A mean value $N_b$ and a standard deviation $N_\sigma$ of the last 50 sampling points of the echo waveform are calculated, and maximums LMP of the echo waveform are calculated by using formula (1), and a first local maximum point with intensity greater than $N_b + 3N_\sigma$ in the LMP is selected as the sea surface echo peak;

$$LMP = WF(\text{find}(\textit{diff}(\text{sign}(\textit{diff}(WF))) < 0) + 1) \quad (1)$$

where WF represents an effective waveform, find represents finding the waveform positions that satisfy a condition, diff represents a difference function, and sign represents a sign function.

Step S2.2, the potential seabed echo positions are determined.

A maximum bathymetry $D_{max}$ of the Aquarius system on the island is about 10 m, and the waveform length corresponding to $2D_{max}$ (20 m) after the sea surface echo peak is intercepted as the effective waveforms. A seabed echo can only appear after a sea surface echo. All local maximum points in the effective waveform after the sea surface echo are calculated to obtain a first-stage local maximum sequence LMPF, as in formula (2); and then local maximums of the LMPF are calculated, that is, the potential seabed echo positions, to obtain a second-stage local maximum sequence LMPS as in formula (3).

$$LMPF = WFAS(\text{find}(\textit{diff}(\text{sign}(\textit{diff}(WFAS))) < 0) + 1) \quad (2)$$

$$LMPS = LMPF(\text{find}(\textit{diff}(\text{sign}(\textit{diff}(LMPF))) < 0) + 1) \quad (3)$$

where WFAS is the effective waveform after the sea surface echo.

Figure 3:
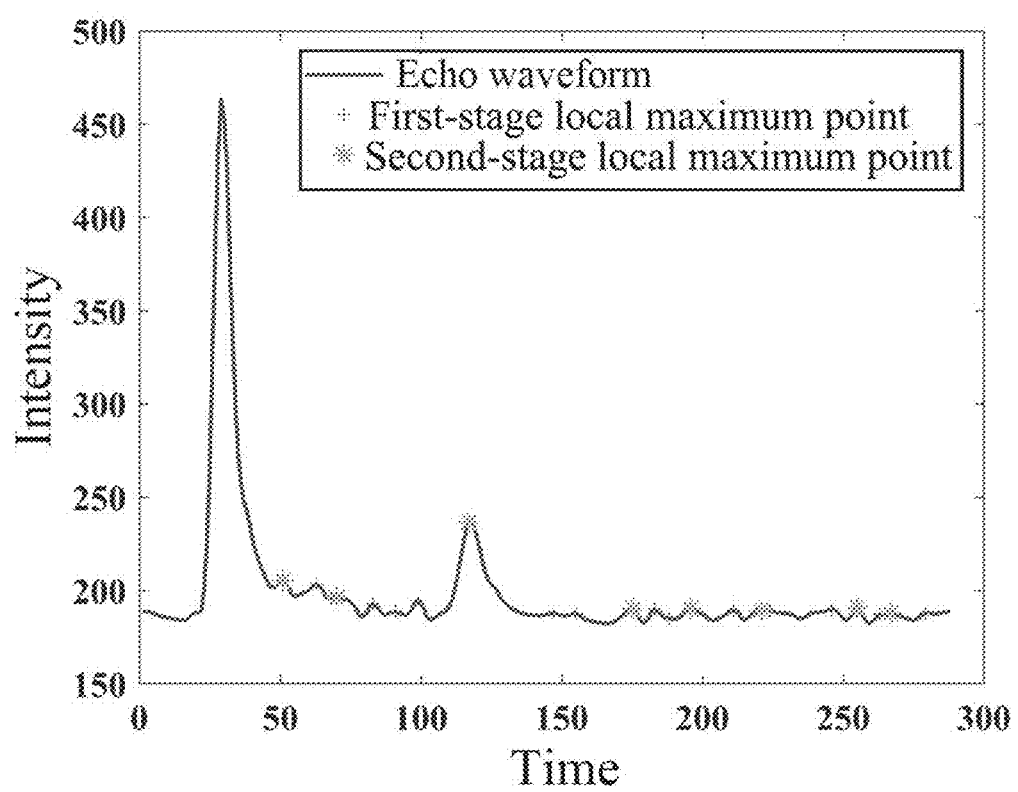
FIG. 3 is a double-peak waveform diagram using two-stage local maximum method according to an embodiment of the present disclosure.
Figure 4:
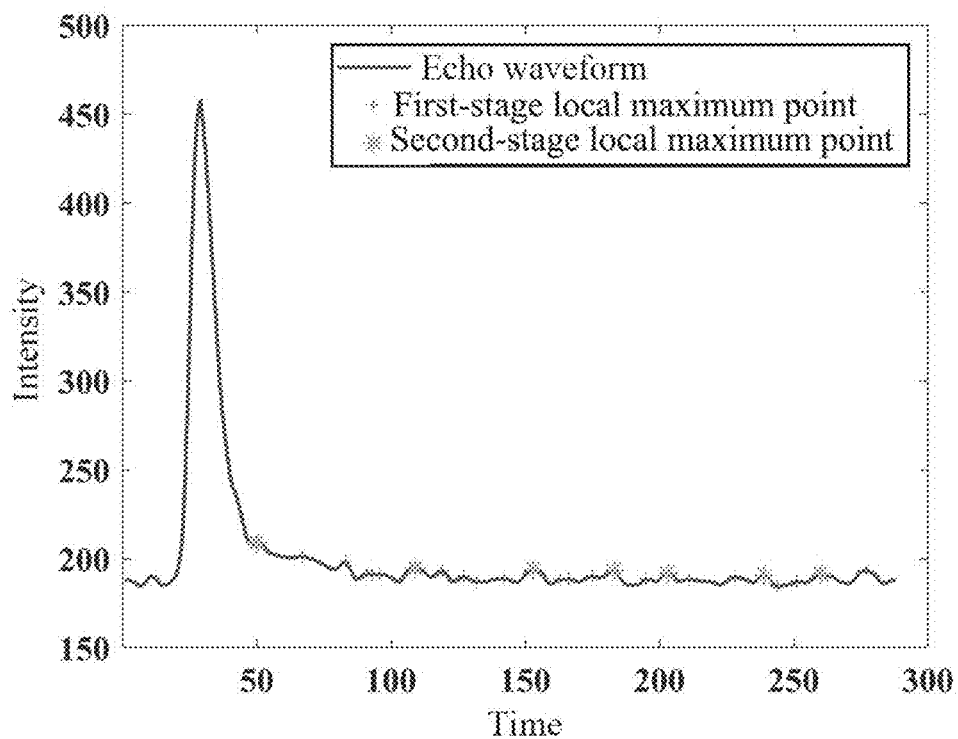
FIG. 4 is a single-peak waveform diagram using two-stage local maximum method according to an embodiment of the present disclosure.

FIG. 3 and FIG. 4 show waveform extraction results with obvious double peaks and only obvious sea surface peaks, respectively, and from FIG. 3 and FIG. 4 it can be seen that the two-stage local maximum method both retain positions with strong intensity in the waveform, and the extracted potential seabed echo positions are dispersed, which is beneficial to extract the subsequent point cloud spatial features; at the same time, compared with the first-stage local maximum method, this method effectively reduces the number of maximums and the amount of calculation.

Step S2.3: seabed points are pre-generated.

The propagation features of a laser pulse in air and seawater are obviously different, and the laser pulse follows Snell's refraction law when passing through an air-sea interface. The present disclosure constructs a coordinate solving model of the seabed points of formula (4) to formula (6) on a basis of a distance, an angle and a coplanar condition equation according to a time difference between the extracted second-stage local maximum and corresponding sea surface echo position, and solves an optimal solution of an equation set by a Levenberg-Marquardt (LM) method.

$$f_1(x, y, z) = (x - x_s)^2 + (y - y_s)^2 + (z - z_s)^2 - \frac{c\Delta t}{2n_w} \quad (4)$$

$$f_2(x, y, z) = (n_1, n_2, n_3) \cdot (x, y, z) + \frac{c\Delta t \cos(\theta_r)}{2n_w} - (x_s, y_s, z_s) \cdot (n_1, n_2, n_3) \quad (5)$$

$$f_3(x, y, z) = v_1 n_2 (z - z_s) + v_2 n_3 (x - x_s) + \quad (6)$$
$$v_3 n_1 (y - y_s) - v_3 n_2 (x - x_s) - v_2 n_1 (z - z_s) - v_1 n_3 (y - y_s)$$

where $f_1(x, y, z)$, $f_2(x, y, z)$, $f_3(x, y, z)$ are three equations of the coordinate solution of seabed points, (x, y, z) is coordinates of a potential seabed point, $(x_s, y_s, z_s)$ is coordinates of corresponding sea surface point, c is a speed of light in the air, $\Delta t$ is a time difference between the sea surface and a second-stage local maximum, $n_w$ is the seawater refractive index, $(n_1, n_2, n_3)$ represents a normal vector of the sea surface which is obtained by fitting a Gaussian quadric surface to sea surface points near $(x_s, y_s, z_s)$, $(v_1, v_2, v_3) = (x_s - x_p, y_s - y_p, z_s - z_p)$ is a laser pulse emission vector, $(x_p, y_p, z_p)$ is a laser position at the pulse emission moment, and $\theta_r$ is a refraction angle which is calculated by formula (7):

$$\theta_r = \arcsin\left(\frac{\sin\left(\arccos\frac{(v_1, v_2, v_3) \cdot (n_1, n_2, n_3)}{|(v_1, v_2, v_3)||(n_1, n_2, n_3)|}\right)}{n_w}\right). \quad (7)$$

The positions of all second-stage local maximums of the waveform in the point cloud are solved to obtain potential seabed point cloud. The seabed points after the coordinate solution should be labelled for the surface-seabed pulses.

Step 3: an ellipsoid neighborhood related to density is defined, and spatial features of a pre-generated point cloud are extracted.

Figure 5:
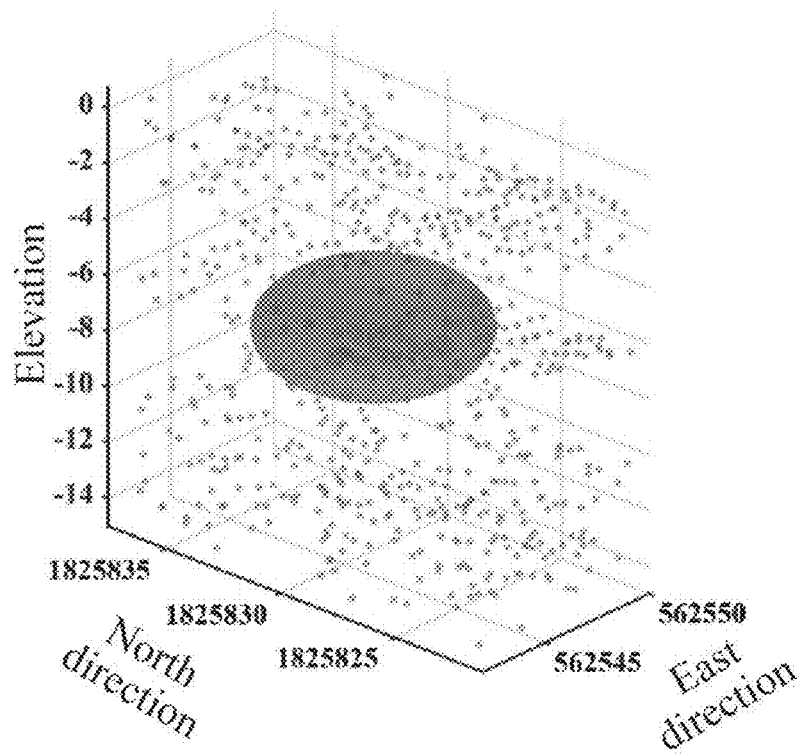
FIG. 5 is a schematic diagram of an ellipsoid neighborhood according to an embodiment of the present disclosure.
Figure 6:
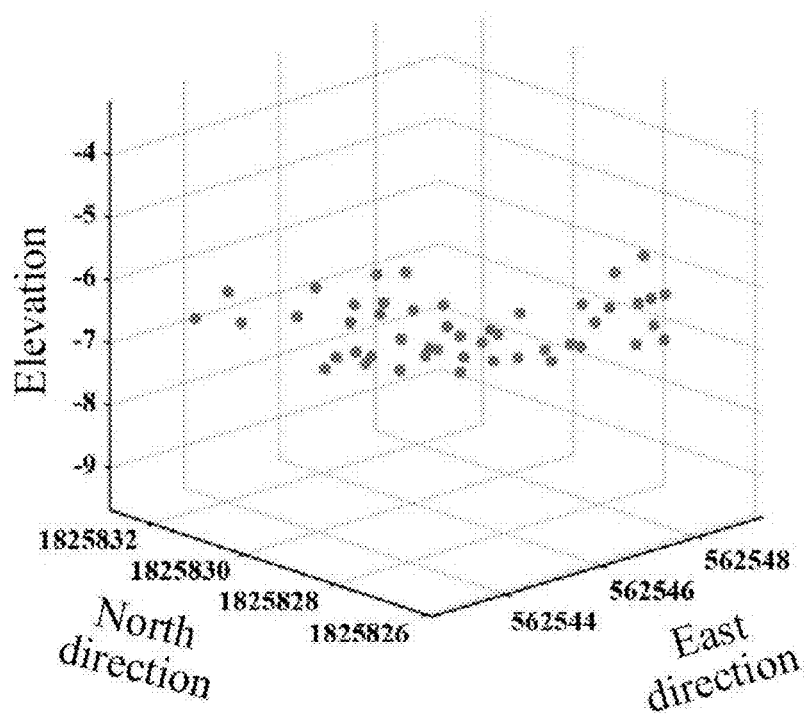
FIG. 6 is a result diagram of the found neighborhood points according to an embodiment of the present disclosure.

There are a large number of noise points in the pre-generated potential seabed point cloud. Comparatively, spatial continuity of weak echo seabed points is different from irregular distribution noise points. The spatial continuity of seabed points is characterized by large horizontal direction and small vertical direction, and the horizontal and vertical directions should have different neighborhood scales. A shape of the ellipsoid neighborhood can be adjusted according to different parameters. FIG. 5 is a schematic diagram of the ellipsoid neighborhood according to an embodiment of the present disclosure. FIG. 6 is a result diagram of found neighborhood points according to an embodiment of the present disclosure.

In a further embodiment, Step 3 specifically includes the following steps:

Step 3.1, ellipsoid neighborhood parameters are determined.

Considering that a size of the ellipsoid determines the number of neighboring points, its axis lengths should be related to point density. The seabed points are constructed as grids, and if there are points in the grid, it is thought that the grid area is scanned, and average point density ρ is calculated by the formula (8):

$$\rho = \frac{N_p}{N_g w^2} \quad (8)$$

where $N_p$ is the number of the seabed points generated by the ALB system, $N_g$ is the number of grids with seabed points, and w is a width of the grid, which is 2 in this embodiment. Three semi-axes of the ellipsoid are assumed as $$l_x = l_y = \frac{4}{\sqrt{\rho}}$$

and $$l_z = \frac{2}{\sqrt{\rho}}.$$

Step S3.2: ellipsoid neighborhood points are found.

The pre-generated potential seabed point cloud are taken as a point set, a KD tree is constructed to shorten a neighborhood search time; for a certain point $p(p_x, p_y, p_z)$ in the point cloud, neighborhood points whose Euclidean distances from the point p is less than $l_x$ (a semi-major axis of the ellipsoid) are found, and points in these neighborhood points that satisfy the formula (9) are the neighborhood points within the ellipsoid;

$$EPS = \left\{ (x_n, y_n, z_n) \Big| \frac{(z_n - p_z)^2}{l_z^2} < \left(1 - \frac{(x_n - p_x)^2}{l_x^2} - \frac{(y_n - p_y)^2}{l_y^2}\right) \right\} \quad (9)$$

where EPS is an ellipsoid neighborhood point set of the point $p(p_x, p_y, p_z)$, $(x_n, y_n, z_n)$ is coordinates of a neighborhood point in the ellipsoid of the point p, and $l_x, l_y, l_z$ are the lengths of the three semi-axes of the ellipsoid.

Step S3.3: spatial features of the point cloud are extracted.

A covariance matrix and three eigenvalues of the ellipsoid neighborhood points are calculated, and $\lambda_1, \lambda_2, \lambda_3$ are obtained in a descending order, and standardized eigenvalues $e_1, e_2, e_3$ are obtained according to $$e_i = \frac{\lambda_i}{\sum \lambda_i};$$

the eigenvalues $e_1, e_2, e_3$, the number n of points in the ellipsoid neighborhood, linearity Le, planarity Pe, scattering Se, anisotropy Ae, an omni-directional variance Oe and an eigenvalue entropy Ee are taken as the spatial features of the point cloud, which are calculated as in formula (10) to formula (15):

$$Le = \frac{e_1 - e_2}{e_1} \quad (10)$$

$$Pe = \frac{e_2 - e_3}{e_1} \quad (11)$$

$$Se = \frac{e_3}{e_1} \quad (12)$$

$$Ae = \frac{e_1 - e_3}{e_1} \quad (13)$$

$$Oe = \sqrt[3]{e_1 e_2 e_3} \quad (14)$$

$$Ee = \sum_{i=1}^{3} e_i \ln(e_i) \quad (15)$$

where $\ln(e_i)$ is a natural logarithm of the eigenvalues $e_1, e_2, e_3$; the finally constructed spatial feature S of the point cloud are $\{e_1, e_2, e_3, n, Le, Pe, Se, Ae, Oe, Ee\}$.

Step 4: a BP neural network is constructed to identify seabed points in the pre-generated point cloud, and the identification result of the seabed points are optimized based on a laser pulse echo sequence and point cloud density.

In a further embodiment, Step 4 specifically includes the following steps:

Step 4.1, the BP neural network is constructed, and the seabed points are identified.

In view of the high reliability of the seabed points generated by the CFD method in the Aquarius system, seabed point cloud generated by the surface-seabed pulses are taken as the training, verification and test data of the BP neural network with the ratio of 7:1.5:1.5. A category of seabed points is labelled as 1, and the category of the rest points is labelled as 0. A three-layer BP neural network including an input layer, a hidden layer and an output layer is constructed. A 10-dimensional spatial features extracted by using the ellipsoid neighborhood are input. The number of the nodes of the hidden layer is set to 100. The seabed points or the rest points are output. Before network training, training samples, verification samples and test samples are normalized to an interval of [0,1] in the same way.

The point cloud generated by the seabed-undefined pulses are taken as the data to be identified which is normalized to the interval of [0,1] in the same way. The constructed BP neural network is used to identify the point cloud generated by the seabed-undefined pulses. The points labelled as 1 in the final identification result are a rough seabed point cloud for identification.

Step S4.2: the identification result of the seabed points is optimized.

Figure 7:
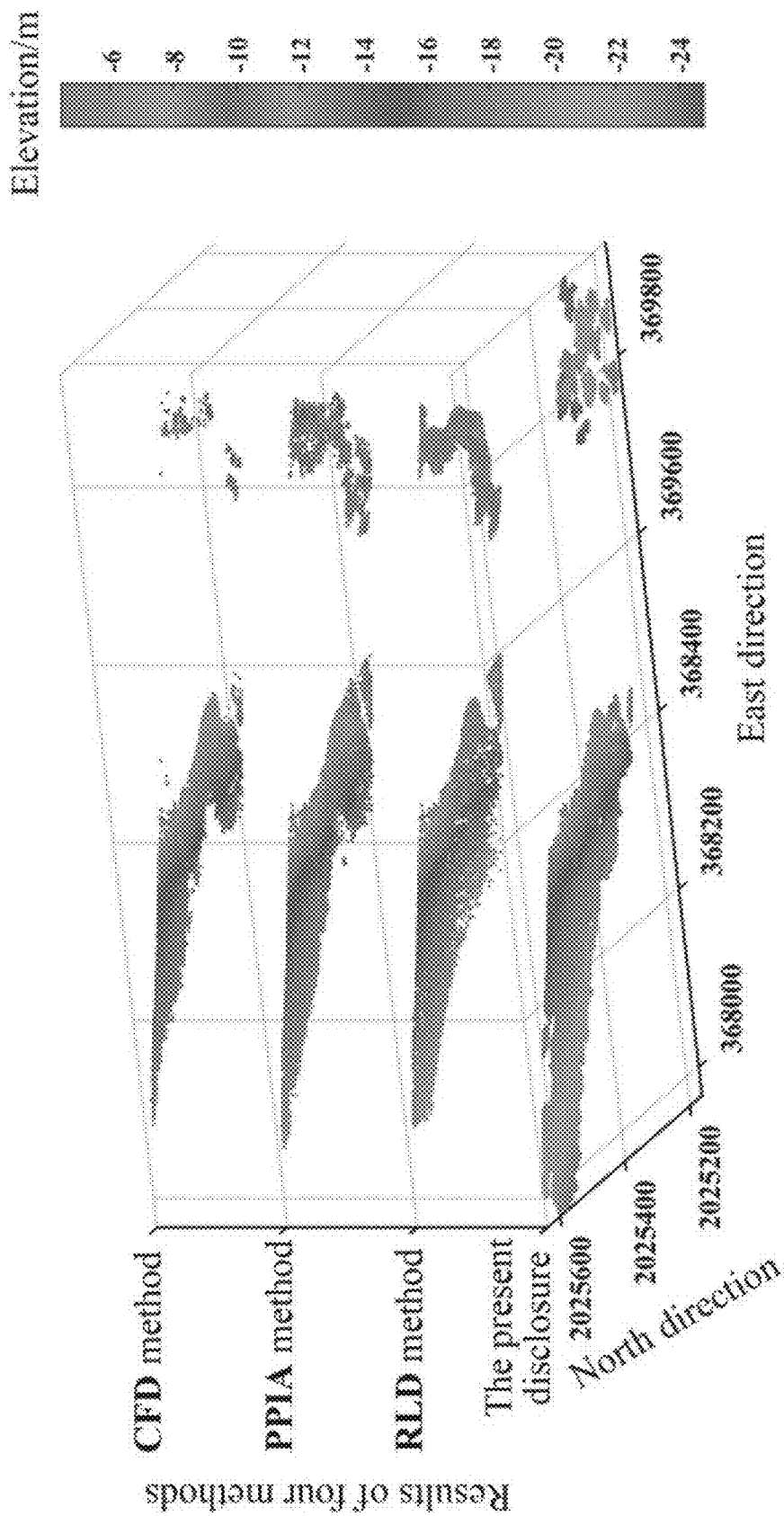
FIG. 7 is a comparison diagram of identification result of seabed points of an island strip 1 according to an embodiment of the present disclosure.
Figure 8:
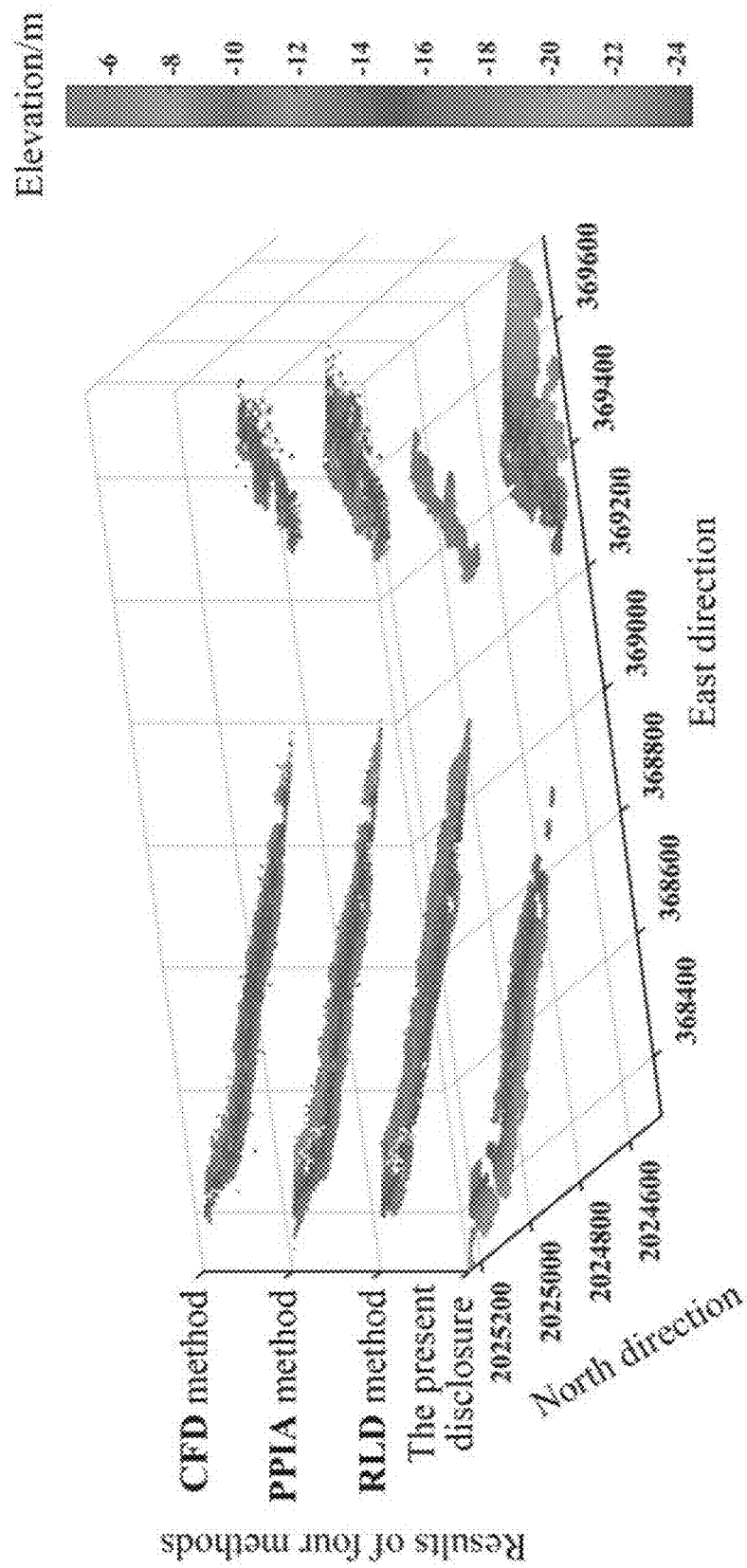
FIG. 8 is a comparison diagram of identification result of seabed points of an island strip 2 according to an embodiment of the present disclosure.

In principle, a single water laser pulse only corresponds to one seabed point. Therefore, the present disclosure only reserves a first seabed point of each laser pulse in the result of the BP neural network. A high-density target point cluster can be extracted from the noise point cloud by using a density-based clustering algorithm (Density-based spatial clustering of applications with noise, DBSCAN). Taking refraction and a factor without seabed echoes into account, a search radius of the DBSCAN is $$eps = \frac{3}{\sqrt{\rho}},$$

and the minimum number of points MinN is set as 20. In addition, in order to avoid an influence of local small point clusters on the identification result, deleting a point cluster which has less than 100 points or is disconnected from the point cloud; and finally reserved points are the seabed point cloud for identification. The result of identification of seabed points are shown in FIGS. 7 and 8. FIG. 7 is a comparison diagram of identification result of seabed points of the island strip 1 according to an embodiment of the present disclosure. FIG. 8 is a comparison diagram of identification result of seabed points of the island strip 2 according to an embodiment of the present disclosure. FIG. 8 shows the result of the identification proposed by the present disclosure. The CFD generates a point cloud for the system. The results of the PPIA, the RLD and the present disclosure are all new point clouds which have been subjected to identification. The result of the embodiment shows that compared with the number of points generated by the system, the number of points generated by identification of the present disclosure are increased by 195.9%, and the maximum available bathymetry depth is increased by 60%. It can be seen that the number of points generated by identification of the present disclosure and the maximum available depth are obviously increased, and the effect thereof is better than the two comparison methods of PPIA and RLD. Therefore, the proposed method has good results in the seabed geology types such as sand and gravel, which is an effective and reliable identification method of ALB seabed weak echoes.

Figure 9:
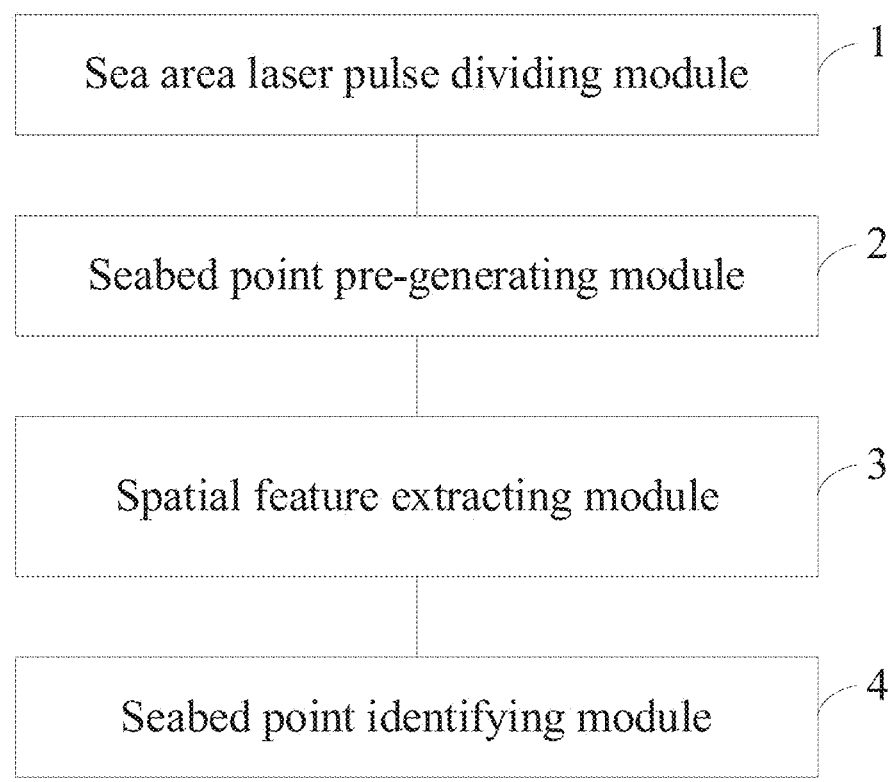
FIG. 9 is a schematic diagram of a system of identification of seabed weak echoes in airborne LiDAR bathymetry according to an embodiment of the present disclosure.

In Embodiment 3, as shown in FIG. 9, a system of identification of seabed weak echoes in airborne LiDAR bathymetry according to an embodiment of the present disclosure includes:

- a sea area laser pulse dividing module 1, configured to divide sea area laser pulses into surface-seabed pulses or seabed-undefined pulses based on preprocessed data;
- a seabed point pre-generating module 2, configured to use two-stage local maximum method to determine potential seabed echo positions of ALB waveforms and pre-generate seabed points;
- a spatial feature extracting module of a pre-generated point cloud 3, configured to define an ellipsoid neighborhood related to density and extract spatial features of a pre-generated point cloud; and
- a seabed point identifying module 4, configured to construct a BP neural network to identify seabed points in the pre-generated point cloud, and optimize the identification result of the seabed points based on a laser pulse echo sequence and point cloud density.

In the above embodiments, the description of each embodiment has its own emphasis. For the parts that are not detailed or recorded in a certain embodiment, reference can be made to the relevant descriptions of other embodiments.

The information interaction, the execution process and other contents between the above devices/units are based on the same concept as the method embodiments of the present disclosure, and their specific functions and the introduced technical effects can be seen in the method embodiments for details, which will not be described in detail here.

It can be clearly understood by those skilled in the field that for the convenience and conciseness of description, only the division of the functional units and modules are taken as an example. In practical application, the functions can be allocated by different functional units and modules as required. That is, the internal structure of the device is divided into different functional units or modules to complete all or part of the functions described above. Each functional unit and module in the embodiment can be integrated into one processing unit, or each unit can exist physically alone, or two or more units can be integrated into one unit. The integrated units can be realized in the form of hardware or software functional units. In addition, the specific name of each functional unit or module is only for conveniently distinguishing each other, and is not used to limit the scope of protection of the present disclosure. For the specific working process of the units and modules in the above system, reference can be made to the corresponding process in the above method embodiments.

Based on the technical solution described in the above embodiments of the present disclosure, the following application examples can be further proposed.

According to the embodiment of the application, the present disclosure further provides a computer device, which includes at least one processor, a memory and a computer program stored in the memory and executable on the at least one processor. The processor, when executing the computer program, can implement the steps in any of the above method embodiments.

The embodiment of the present disclosure further provides a computer-readable storage medium, wherein a computer program is stored in the computer-readable storage medium, and the computer program, when executed by a processor, can implement the steps in any of the above method embodiments.

The embodiment of the present disclosure further provides an information data processing terminal, where the information data processing terminal is configured to provide a user input interface to implement the steps in any of the above method embodiments when implemented on an electronic device. The information data processing terminal is not limited to a mobile phone, a computer and a switch.

The embodiment of the present disclosure further provides a server, which is configured to provide a user input interface to implement the steps in any of the above method embodiments when implemented on an electronic device.

The embodiment of the present disclosure further provides a computer program product, where the computer program product, when operating on an electronic device, can implement the steps in any of the above method embodiments when implemented on an electronic device.

The integrated unit can be stored in a computer-readable storage medium if being implemented in the form of a software functional unit and sold or used as an independent product. Based on this understanding, all or part of the processes in the above embodiment method of the present disclosure can be completed by instructing related hardware through a computer program. The computer program can be stored in a computer-readable storage medium, and the computer program can realize the steps in any of the above method embodiments when executed by a processor. The computer program includes a computer program code, which can be in a source code form, an object code form, an executable file or some intermediate form, etc. The computer-readable medium can at least include: any entity or device capable of carrying a computer program code to a camera device/terminal device, a recording medium, a computer memory, a Read-Only Memory (ROM), a Random Access Memory (RAM), an electric carrier signal, a telecommunication signal and a software distribution medium, such as a USB flash drive, a removable hard disk, a magnetic disk or an optical disk.

The above is only the preferred specific implementation of the present disclosure, but the scope of protection of the present disclosure is not limited thereto. Any modification, equivalent substitution and improvement made within the technical scope provided by the present disclosure by those skilled in the field within the spirit and principle of the present disclosure should be included in the scope of protection of the present disclosure.

What is claimed is:

1. An identification method of seabed weak echoes by airborne LIDAR (ALB) bathymetry, the method comprising:
S1: dividing sea area laser pulses into surface-seabed pulses or seabed-undefined pulses based on preprocessed data;
S2: using two-stage local maximum method to determine potential seabed echo positions of ALB waveforms and pre-generate a potential seabed point cloud;
S3: extracting spatial features of the potential seabed point cloud by using an ellipsoid neighborhood; and
S4: constructing a backward propagation (BP) neural network to identify seabed points in the potential seabed point cloud, and optimizing the identification result of the seabed points based on a laser pulse echo sequence and point cloud density;
wherein in Step S2, using two-stage local maximum method to determine the potential seabed echo positions of the ALB waveforms and pre-generate the potential seabed point cloud specifically comprises:
Step S2.1: determining a sea surface echo peak through a relationship between echo intensity and noise;
Step S2.2: determining the potential seabed echo positions, which comprises: with a maximum bathymetry performance of an (ALB) system being $D_{max}$, intercepting a waveform length corresponding to $2D_{max}$ after the sea surface echo peak as an effective waveform; calculating all local maximum points in the effective waveform after the sea surface echo peak to obtain a first-stage local maximum sequence LMPF; and then calculating local maximums of the LMPF to obtain a second-stage local maximum sequence LMPS as the potential seabed echo positions; and
Step S2.3: pre-generating the potential seabed point cloud, which comprises: constructing a coordinate solving model of the seabed points on a basis of a distance, an angle and a coplanar condition equation according to a time difference between the extracted second-stage local maximum sequence LMPS and corresponding sea surface echo position, and solving an optimal solution of an equation set by a Levenberg-Marquardt method: solving positions of all points for the second-stage local maximum sequence LMPS of the ALB waveforms to obtain the potential seabed point cloud; and labeling seabed points for a surface-seabed point cloud of the potential seabed point cloud after a coordinate solution for the surface-seabed pulses.

2. The identification method of seabed weak echoes by airborne LiDAR bathymetry according to claim 1, wherein in Step S2.1, determining the sea surface echo peak through the relationship between echo intensity and noise comprises:

calculating a mean value $N_b$ and a standard deviation $N_\sigma$ of last 50 sampling points of the echo waveform, and calculating maximums LMP of the echo waveform by using formula (1), and selecting a first local maximum point with intensity greater than $N_b + 3N_\sigma$ in the LMP as the sea surface echo peak;

$$LMP = WF(\text{find}(\text{diff}(\text{sign}(\text{diff}(WF))) < 0) + 1) \qquad (1)$$

where WF represents the effective waveform, find represents finding the waveform positions that satisfy a condition, diff represents a difference function, and sign represents a sign function;
in Step S2.2, the first-stage local maximum sequence LMPF is expressed as:

$$LMPF = WFAS(\text{find}(\text{diff}(\text{sign}(\text{diff}(WFAS))) < 0) + 1) \qquad (2)$$

where WF AS is the effective waveform after the sea surface echo;
the second-stage local maximum sequence LMPS is expressed as:

$$LMPS = LMPF(\text{find}(\text{diff}(\text{sign}(\text{diff}(LMPF))) < 0) + 1) \qquad (3)$$

in Step S2.3, the coordinate solving model of the seabed points comprises:

$$f_1(x, y, z) = (x - x_s)^2 + (y - y_s)^2 + (z - z_s)^2 - \frac{c\Delta t}{2n_w} \qquad (4)$$

$$f_2(x, y, z) = (n_1, n_2, n_3) \cdot (x, y, z) + \frac{c\Delta t \cos(\theta_r)}{2n_w} - (x_s, y_s, z_s) \cdot (n_1, n_2, n_3) \qquad (5)$$

$$f_3(x, y, z) = v_1 n_2 (z - z_s) + v_2 n_3 (x - x_s) + \qquad (6)$$
$$v_3 n_1 (y - y_s) - v_3 n_2 (x - x_s) - v_2 n_1 (z - z_s) - v_1 n_3 (y - y_s)$$

where $f_1(x, y, z)$, $f_2(x, y, z)$, $f_3(x, y, z)$ are three equations of coordinate solution of seabed points, (x, y, z) is coordinates of a potential seabed point, $(x_s, y_s, z_s)$ is coordinates of a corresponding sea surface point, c is a speed of light in the air, $\Delta t$ is a time difference between a sea surface and a second-stage local maximum, $n_w$ is the seawater refractive index, $(n_1, n_2, n_3)$ represents a normal vector of the sea surface which is obtained by fitting a Gaussian quadric surface to sea surface points near $(x_s, y_s, z_s)$, $(v_1, v_2, v_3) = (x_s - x_p, y_s - y_p, z_s - z_p)$ is a laser pulse emission vector, $(x_p, y_p, z_p)$ is a laser position at a pulse emission moment, and $\theta_r$ is a refraction angle which is calculated by formula (7):

$$\theta_r = \arcsin\left(\frac{\sin\left(\arccos\frac{(v_1, v_2, v_3) \cdot (n_1, n_2, n_3)}{|(v_1, v_2, v_3)||(n_1, n_2, n_3)|}\right)}{n_w}\right). \qquad (7)$$

3. The identification method of seabed weak echoes by airborne LiDAR bathymetry according to claim 1, wherein in Step S3, extracting spatial features of the potential seabed point cloud by using the ellipsoid neighborhood comprises:

S3.1: determining ellipsoid neighborhood parameters;
S3.2: finding ellipsoid neighborhood points; and
S3.3: extracting the spatial features of the potential seabed point cloud.

4. The identification method of seabed weak echoes by airborne LiDAR bathymetry according to claim 3, wherein in Step S3.1, determining the ellipsoid neighborhood parameters comprises: constructing the seabed points as grids, in which if there are points in a grid, the grid area is scanned, and average point density ρ is calculated by the following formula:

$$\rho = \frac{N_p}{N_g w^2} \quad (8)$$

where $N_p$ is a number of the seabed points generated by the ALB system, $N_g$ is a number of grids with seabed points, and w is a width of the grid;

wherein, three semi-axes of an ellipsoid are set as $$l_x = l_y = \frac{4}{\sqrt{\rho}} \text{ and } l_z = \frac{2}{\sqrt{\rho}};$$

in Step S3.2, finding the ellipsoid neighborhood points comprises: taking the potential seabed point cloud as a point set, constructing a k-dimensional (KD) tree to shorten neighborhood search time; for a certain point $p(p_x, p_y, P_z)$ in the potential seabed point cloud, finding neighborhood points whose Euclidean distances from the point p are less than a semi-major axis $l_x$ of the ellipsoid, and points in these neighborhood points that satisfy the following formula are neighborhood points within the ellipsoid;

$$EPS = \left\{ (x_n, y_n, z_n) \left| \frac{(z_n - p_z)^2}{l_z^2} < \left(1 - \frac{(x_n - p_x)^2}{l_x^2} - \frac{(y_n - p_y)^2}{l_y^2}\right) \right. \right\} \quad (9)$$

where EPS is an ellipsoid neighborhood point set of the point $p(p_x, p_y, p_z)$, $(x_n, y_n, z_n)$ is coordinates of a neighborhood point in the ellipsoid of the point p, and $l_x$, $l_y$, $l_z$ are lengths of the three semi-axes of the ellipsoid.

5. The identification method of seabed weak echoes by airborne LiDAR bathymetry according to claim 4, wherein in Step S3.3, extracting the spatial features of the potential seabed point cloud comprises:

calculating a covariance matrix and three eigenvalues of the ellipsoid neighborhood points, and obtaining $\lambda_1$, $\lambda_2$, $\lambda_3$ in a descending order, and obtaining standardized eigenvalues $e_1$, $e_2$, $e_3$ according to $$e_i = \frac{\lambda_i}{\sum \lambda_i};$$

taking the eigenvalues $e_1$, $e_2$, $e_3$, a number n of in the ellipsoid neighborhood points, linearity Le, planarity Pe, scattering Se, anisotropy Ae, an omni-directional variance Oe and an eigenvalue entropy Ee as the spatial features of the potential seabed point cloud, which are calculated as follows:

$$Le = \frac{e_1 - e_2}{e_1} \quad (10)$$

$$Pe = \frac{e_2 - e_3}{e_1} \quad (11)$$

$$Se = \frac{e_3}{e_1} \quad (12)$$

$$Ae = \frac{e_1 - e_3}{e_1} \quad (13)$$

$$Oe = \sqrt[3]{e_1 e_2 e_3} \quad (14)$$

$$Ee = \sum_{i=1}^{3} e_i \ln(e_i) \quad (15)$$

where $\ln(e_i)$ is a natural logarithm of the eigenvalues $e_1$, $e_2$, $e_3$; finally constructed spatial features of the potential seabed point cloud are $\{e_1, e_2, e_3, n, Le, Pe, Se, Ae, Oe, Ee\}$.

6. The identification method of seabed weak echoes by airborne LiDAR bathymetry according to claim 5, wherein in Step S4, constructing the BP neural network to identify the seabed points in the potential seabed point cloud, and optimizing the identification result of the seabed points based on the laser pulse echo sequence and the point cloud density comprises:

Step S4.1: constructing the BP neural network and identifying the seabed points; and Step S4.2, optimizing the identification result of the seabed points.

7. The identification method of seabed weak echoes by airborne LiDAR bathymetry according to claim 6, wherein in Step S4.1, constructing the BP neural network and identifying the seabed points comprises:

taking the surface-seabed point cloud, of the potential seabed point cloud, that is generated by the surface-seabed pulses and taken as training, verification and test data of the BP neural network with a ratio of 7:1.5:1.5, and wherein taking the surface-seabed point cloud comprises labelling a category of seabed points as 1, labelling a category of rest points as 0; constructing a three-layer BP neural network comprising an input layer, a hidden layer and an output layer, in which 10-dimensional spatial features extracted by using the ellipsoid neighborhood are input, a number of nodes of the hidden layer is set to 100, and the seabed points or the rest points are output; before network training, training samples, verification samples and test samples are normalized to an interval of [0,1]; and taking a surface-undefined point cloud, of the surface-seabed point cloud, that is generated by the seabed-undefined pulses and taken as data to be normalized to the interval of [0,1]; and using the BP neural network to identify a rough seabed point cloud from the surface-undefined point cloud, wherein identifying the rough seabed point cloud comprises labelling a category of points as 1 in a final identification result.

8. The identification method of seabed weak echoes by airborne LiDAR bathymetry according to claim 7, wherein in Step S4.2, optimizing the identification result of the seabed points comprises:

reserving a first seabed point of each laser pulse in the rough seabed point cloud of the BP neural network, extracting a high-density target point cluster from a noise point cloud by using a density-based clustering algorithm, taking a refraction and a factor without seabed echoes into account, setting a search radius of the density clustering algorithm as $$eps = \frac{3}{\sqrt{\rho}}$$

and a minimum number of points MinN as 20, and deleting a point cluster which has less than 100 points or is disconnected from the point cloud; and taking finally reserved points as seabed point cloud for identification.

9. A system of identification of seabed weak echoes by airborne LIDAR bathymetry (ALB), which implement the identification method of seabed weak echoes in airborne LiDAR bathymetry according to claim 1, and the system comprises:
- a sea area laser pulse dividing module (1), configured to divide sea area laser pulses into surface-seabed pulses or seabed-undefined pulses based on preprocessed data;
- a seabed point pre-generating module (2), configured to use two-stage local maximum method to determine potential seabed echo positions of ALB waveforms and pre-generate a potential seabed point cloud;
- a spatial feature extracting module of the potential seabed point cloud (3), configured to define an ellipsoid neighborhood related to density and extract spatial features of the potential seabed point cloud; and
- a seabed point identifying module (4), configured to construct a backward propagation (BP) neural network to identify seabed points in the potential seabed point cloud, and optimize an identification result of the seabed points based on a laser pulse echo sequence and point cloud density.

* * * * *